US009448572B2

(12) United States Patent
Guo et al.

(10) Patent No.: US 9,448,572 B2
(45) Date of Patent: Sep. 20, 2016

(54) VOLTAGE ADJUSTING CIRCUIT AND ALL-IN-ONE COMPUTER INCLUDING THE SAME

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Song Guo, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 71 days.

(21) Appl. No.: 14/596,678

(22) Filed: Jan. 14, 2015

(65) Prior Publication Data

US 2016/0147238 A1 May 26, 2016

(30) Foreign Application Priority Data

Nov. 21, 2014 (CN) .......................... 2014 1 0671645

(51) Int. Cl.

| | |
|---|---|
| ***G06F 3/038*** | (2013.01) |
| ***G09G 5/00*** | (2006.01) |
| ***G05F 1/46*** | (2006.01) |
| ***G09G 3/20*** | (2006.01) |
| ***G09G 3/36*** | (2006.01) |
| ***G05F 1/613*** | (2006.01) |

(52) U.S. Cl.

CPC ............... *G05F 1/462* (2013.01); *G05F 1/613* (2013.01); *G09G 3/2096* (2013.01); *G09G 3/36* (2013.01); *G09G 2330/02* (2013.01)

(58) Field of Classification Search

None

See application file for complete search history.

(56) References Cited

U.S. PATENT DOCUMENTS

2012/0038413 A1* 2/2012 Lin ..................... G09G 3/3696 327/518

* cited by examiner

*Primary Examiner* — Nicholas Lee

(74) *Attorney, Agent, or Firm* — Zhigang Ma

(57) ABSTRACT

A voltage adjusting circuit includes a voltage regulator module, a control chip, a platform controller hub (PCH), a basic input-output system (BIOS), a number of switching units, and a number of resistors. The voltage adjusting circuit is utilized to receive a voltage signal to supply a working voltage to a liquid crystal display (LCD). The voltage adjusting circuit controls switching units to turn on or turn off, and changes the current of the control chip, and further outputs different voltages to different LCDs. The disclosure further provides an all-in-one computer including the voltage adjusting circuit.

10 Claims, 2 Drawing Sheets

VOLTAGE ADJUSTING CIRCUIT AND ALL-IN-ONE COMPUTER INCLUDING THE SAME

FIELD

The subject matter herein generally relates to a voltage adjusting circuit and an all-in-one computer including the voltage adjusting circuit.

BACKGROUND

In some all-in-one computers, a converting board converts a +19 volt (V) voltage of a motherboard to a working voltage to power a liquid crystal display (LCD). Different LCDs may require different working voltages. However, the converting board generally cannot convert the +19V to a variety of different working voltages for different LCDs.

BRIEF DESCRIPTION OF THE DRAWINGS

Implementations of the present technology will now be described, by way of example only, with reference to the attached figures.

DETAILED DESCRIPTION

Figure 1:
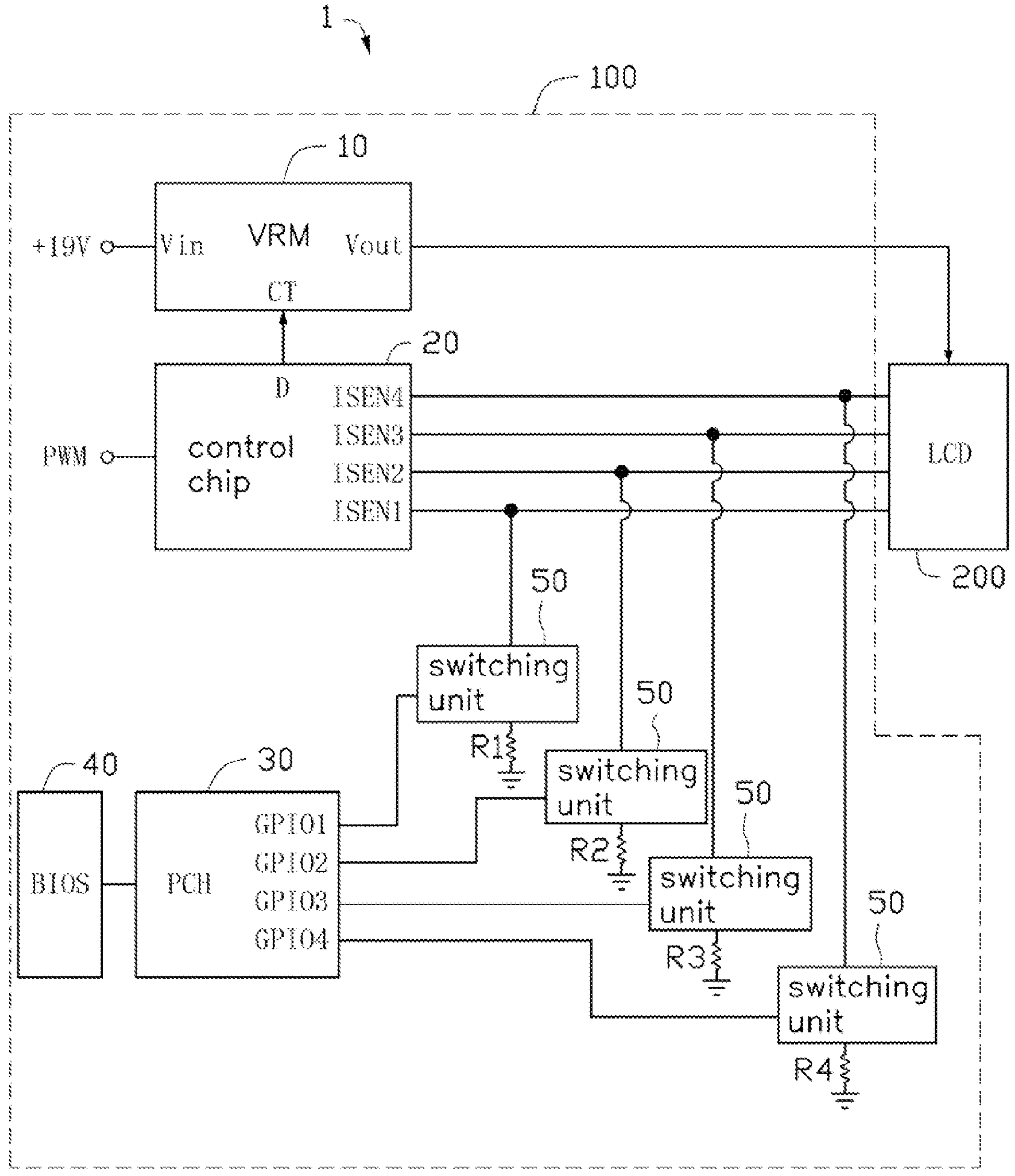
FIG. 1 is a circuit diagram of an embodiment of a voltage adjusting circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a voltage adjusting circuit 100.

FIG. 1 illustrates an embodiment of the voltage adjusting circuit 100 employed in an all-in-one computer 1. The voltage adjusting circuit 100 can comprise a voltage regulator module (VRM) 10, a control chip 20, a platform controller hub (PCH) 30, a basic input-output system (BIOS) 40, four switching units 50, and four resistors R1-R4.

An input terminal Vin of the VRM 10 receives a +19 volt (V) voltage from the all-in-one computer 1. An output terminal Vout of the VRM 10 is coupled to a liquid crystal display (LCD) 200 of the all-in-on computer 1. The VRM 10 converts the +19V voltage to an appropriate working voltage to the LCD 200 through the output terminal Vout.

A control terminal CT of the VRM 10 is coupled to a slave terminal D of the control chip 20. Four sensor terminals ISEN1-ISEN4 of the control chip 20 are coupled to the LCD 200. The control chip 20 senses a current of the LCD 200 through the four sensor terminals ISEN1-ISEN4, and outputs a control signal to control the VRM 10 to output the proper working voltage to the LCD 200. An input terminal of the control chip 20 receives a pulse width modulation (PWM) signal for adjusting brightness of the LCD 200.

Each switching unit 50 comprises a first terminal, a second terminal, and a control terminal. The first terminals of the four switching units 50 are respectively coupled to the four sensor terminals ISEN1-ISEN4. The second terminals of the four switching units 50 are respectively coupled to ground through the four resistors R1-R4. The BIOS 40 is coupled to the PCH 30. First to fourth input output pins GPIO1-GPIO4 are respectively coupled to the control terminals of the four switching units 50.

Figure 2:
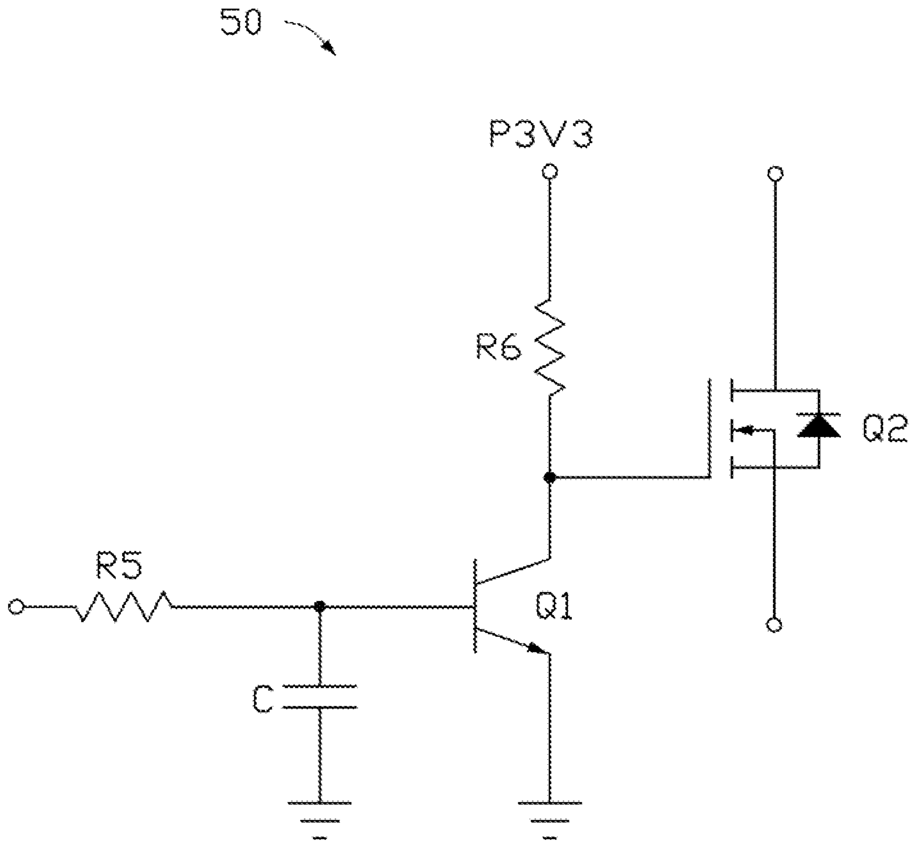
FIG. 2 is a circuit diagram of an embodiment of a switching unit of the voltage adjusting circuit.

FIG. 2 illustrates an embodiment of the switching unit 50. The switching unit 50 can comprise electronic switches Q1, Q2, resistors R5, R6, and a capacitor C. A control terminal of the electronic switch Q1 is coupled to a first end of the resistor R5. A second end of the resistor R5 is defined as the control terminal of the switching unit 50. The control terminal of the electronic switch Q1 is also coupled to ground through the capacitor C. A first terminal of the electronic switch Q1 is coupled to a power supply P3V3 through the resistor R6. A second terminal of the electronic switch Q1 is coupled to ground. A control terminal of the electronic switch Q2 is coupled to the first terminal of the electronic switch Q1. A first terminal of the electronic switch Q2 is defined as the first terminal of the switching unit 50. A second terminal of the electronic switch Q2 is defined as the second terminal of the switching unit 50.

In the embodiment, the control chip 20 is an OZ9967 type control chip. According to the specification table of the OZ9967 type control chip, an equation of $V_{LCD}$ may be as follows:

$$V_{LCD} = \frac{2LI_{LCD}}{C(1-C)^2T},$$

wherein $V_{LCD}$ stands for a voltage output from the VRM 10, L stands for an output inductance of the control chip 20, $I_{LCD}$ stands for a sum of the current sensed by the four sensor terminals ISEN1-ISEN4, C stands for a duty cycle of the PWM signals received by the control chip 20, T stands for an operation period of the control chip 20.

According to the equation, the voltage $V_{LCD}$ is in proportion to the current $I_{LED}$. The voltage $V_{LCD}$ varies with the current of the LCD 200 which can be adjusted by controlling the switching units 50 respectively to be turned off or turned on.

For example, when the LCD 200 of a first type is connected to the voltage adjusting circuit 100, the corresponding rated voltage is selected in the menu of the BIOS 40, the input output pins GPIO1-GPIO4 of the PCH 30 are controlled to output high level signals. The electronic switches Q1 of the four switching units 50 are turned on, the electronic switches Q2 of the four switching units 50 are turned off. Thus, the current $I_{LCD}$ is adjusted and the voltage $V_{LCD}$ output from the VRM 10 is accordingly adjusted to be equal to the rated voltage of the LCD 200 of the first type.

When the LCD 200 of a second type is connected to the voltage adjusting circuit 100, the corresponding rated voltage of the LCD 200 is selected in the menu of the BIOS 40, the input output pin GPIO1 of the PCH 30 outputs a low level signal and input output pins GPIO2-GPIO4 of the PCH 30 output high level signals. The electronic switch Q1 of the switching unit 50 coupled to the first input output pin GPIO1 is turned off, the electronic switch Q2 of the switching unit 50 coupled to the first input output pin GPIO1 is turned on. The electronic switches Q1 of the switching units 50 respectively coupled to the input output pins GPIO2-GPIO4 are turned on, the electronic switches Q2 of the switching units 50 respectively coupled to the input output pins GPIO2-GPIO4 are turned off. Thus, the current $I_{LCD}$ is adjusted and the voltage $V_{LCD}$ output from the VRM 10 is accordingly adjusted to be equal to the rated voltage of the LCD 200 of the second type.

In at least one embodiment, the electronic switch Q1 can be an npn bipolar junction transistor, and the electronic switch Q2 can be an n-channel field effect transistor.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A voltage adjusting circuit comprising:

a voltage regulator module (VRM) comprising an input terminal configured for receiving a first voltage, an output terminal connected to a liquid crystal display (LCD), and a control terminal;

a control chip comprising a plurality of sensor terminals connected to the LCD to sense currents of the LCD, and a slave terminal connected to the control terminal of the VRM to output a control signal to the VRM, the VRM outputting working voltages to the LCD according to the control signal;

a platform controller hub (PCH) comprising a plurality of input output pins;

a basic input-output system (BIOS) coupled to the PCH for controlling output signals of the input output pins of the PCH according to a rated voltage of the LCD; and a plurality of switching units, wherein each of the switching units comprises a first terminal, a second terminal, and a control terminal, the first terminals of the plurality of switching units are respectively coupled to the plurality of sensor terminals of the control chip, the second terminal of the plurality of switching units are grounded through a first resistor, and the control terminals of the plurality of switching units are respectively coupled to the input/output pins of the PCH.

2. The voltage adjusting circuit of claim 1, wherein each the switching unit comprises a first electronic switch, a second electronic switch, a second resistor, a third resistor, and a capacitor, a control terminal of the first electronic switch is coupled to a first end of the second resistor, a second end of the second resistor is defined as the control terminal of the switching unit, the control terminal of the first electronic switch is also coupled to ground through the capacitor, a first terminal of the first electronic switch is coupled to a power supply through the second resistor, a second terminal of the first electronic switch is coupled to ground, a control terminal of the second electronic switch is coupled to the first terminal of the first electronic switch, a first terminal of the second electronic switch is defined as the first terminal of the switching unit, and a second terminal of the second electronic switch is defined as the second terminal of the switching unit.

3. The voltage adjusting circuit of claim 2, wherein the first electronic switch is an npn bipolar junction transistor.

4. The voltage adjusting circuit of claim 2, wherein the second electronic switch is an n-channel field effect transistor.

5. The voltage adjusting circuit of claim 1, wherein the BIOS controls the output signals of the input output pins of the PCH through a menu of the BIOS.

6. An all-in-one computer comprising:

a liquid crystal display;

a voltage regulator module (VRM) comprising an input terminal for receiving a first voltage, an output terminal connected to the LCD, and a control terminal;

a control chip comprising a plurality of sensor terminals connected to the LCD to sense currents of the LCD, and a slave terminal connected to the control terminal of the VRM to output control signals to the VRM, the VRM outputting working voltages to the LCD according to the control signals;

a platform controller hub (PCH) comprising a plurality of input/output pins;

a basic input-output system (BIOS) coupled to the PCH for controlling output signals of the input output pins of the PCH according to a rated voltage of the LCD; and a plurality of switching units, wherein a first terminal of each switching unit is coupled to a corresponding sensor terminal of the control chip, a second terminal of each switching unit is coupled to ground through a first resistor, and a control terminal of each switching unit is coupled to a corresponding input output pin of the PCH.

7. The all-in-one computer of claim 6, wherein the switching unit comprises a first electronic switch, a second electronic switch, a second resistor, a third resistor, and a capacitor, a control terminal of the first electronic switch is coupled to a first end of the second resistor, a second end of the second resistor is defined as the control terminal of the switching unit, the control terminal of the first electronic switch is also coupled to ground through the capacitor, a first terminal of the first electronic switch is coupled to a power supply through the second resistor, a second terminal of the first electronic switch is coupled to ground, a control terminal of the second electronic switch is coupled to the first terminal of the first electronic switch, a first terminal of the second electronic switch is defined as the first terminal of the switching unit, and a second terminal of the second electronic switch is defined as the second terminal of the switching unit.

8. The all-in-one computer of claim 7, wherein the first electronic switch is an npn bipolar junction transistor.

9. The all-in-one computer of claim 7, wherein the second electronic switch is an n-channel field effect transistor.

10. The all-in-one computer of claim 6, wherein the BIOS controls the output signals of input output pins of the PCH through a menu of the BIOS.

* * * * *